United States Patent
Li et al.

(10) Patent No.: US 10,482,495 B2
(45) Date of Patent: Nov. 19, 2019

(54) BEHAVIORAL RETARGETING SYSTEM AND METHOD FOR COOKIE-DISABLED DEVICES

(71) Applicant: Oath Inc., New York, NY (US)

(72) Inventors: Wetong Li, Saratoga, CA (US); Yi Mao, Sunnyvale, CA (US)

(73) Assignee: Oath Inc., New York, NY (US)

( * ) Notice: Subject to any disclaimer, the term of this patent is extended or adjusted under 35 U.S.C. 154(b) by 676 days.

(21) Appl. No.: 14/084,324

(22) Filed: Nov. 19, 2013

(65) Prior Publication Data

US 2014/0297394 A1 Oct. 2, 2014

Related U.S. Application Data

(60) Provisional application No. 61/805,152, filed on Mar. 26, 2013.

(51) Int. Cl.

| | |
|---|---|
| *G06Q 30/00* | (2012.01) |
| *G06Q 30/02* | (2012.01) |
| *G06T 1/00* | (2006.01) |
| *G06T 3/00* | (2006.01) |
| *H04N 21/414* | (2011.01) |

(52) U.S. Cl.
CPC ......... *G06Q 30/0251* (2013.01); *G06Q 30/02* (2013.01); *G06Q 30/0269* (2013.01); *G06Q 30/0277* (2013.01); *G06T 1/0021* (2013.01); *G06T 1/0064* (2013.01); *G06T 3/0006* (2013.01); *H04N 21/41415* (2013.01)

(58) Field of Classification Search
CPC . G06Q 30/0277; G06Q 30/0269; G06Q 30/02
See application file for complete search history.

(56) References Cited

U.S. PATENT DOCUMENTS

| | | | |
|---|---|---|---|
| 2001/0037316 A1* | 11/2001 | Shiloh | G06F 21/6254 705/74 |
| 2003/0208493 A1* | 11/2003 | Hall | G06F 16/289 |
| 2007/0239517 A1* | 10/2007 | Chung | G06Q 30/02 705/14.53 |

(Continued)

OTHER PUBLICATIONS

Papadias; Indexing Spatio-Temporal Daata Warehouses; ICDE'02; IEEE; 10 pages; public year 2002.*

(Continued)

*Primary Examiner* — Radu Andrei
(74) *Attorney, Agent, or Firm* — Cooper Legal Group, LLC (57) ABSTRACT

A system is provided for retargeting advertisements and is based on a database storing user behavior data related to information for a plurality of consumers. An index-lookup processes the user behavior data and translates the user behavior data into a plurality of indices. A data loading module processes the plurality of indices and generates a multi-indexed user behavior cube. An online query module receives a request for an advertisement and processes the request to determine one or more related user attributes and retrieves user behavior data from the multi-indexed user behavior cube using the related user attributes. An ad recommendation module receives the set of user behaviors and generates a list of recommended advertisements using the set of user behaviors data and an advertiser retargeting criterion.

20 Claims, 5 Drawing Sheets

(56) References Cited

U.S. PATENT DOCUMENTS

| | | | | |
|---|---|---|---|---|
| 2007/0239535 | A1* | 10/2007 | Koran | G06Q 30/02 705/14.25 |
| 2008/0169914 | A1* | 7/2008 | Albertson | B60W 40/09 340/438 |
| 2008/0294495 | A1* | 11/2008 | Jain | G06Q 30/0201 705/7.29 |
| 2009/0089151 | A1* | 4/2009 | Protheroe | G06Q 10/00 705/14.69 |
| 2009/0313082 | A1* | 12/2009 | Mehta | G06Q 20/123 705/14.53 |
| 2010/0076815 | A1* | 3/2010 | Jain | G06Q 30/02 705/7.29 |
| 2010/0088715 | A1* | 4/2010 | Sloo | G06Q 10/06393 725/21 |
| 2010/0106835 | A1* | 4/2010 | Mikan | H04L 41/5054 709/226 |
| 2010/0109837 | A1* | 5/2010 | Sato | E05B 35/086 340/5.65 |
| 2010/0125505 | A1* | 5/2010 | Puttaswamy | G06Q 30/02 705/14.67 |
| 2010/0179855 | A1* | 7/2010 | Chen | G06Q 10/063 705/7.31 |
| 2011/0161331 | A1* | 6/2011 | Chung | G06Q 30/02 707/751 |
| 2012/0023247 | A1* | 1/2012 | Minamizawa | G06F 21/6263 709/229 |
| 2013/0073546 | A1* | 3/2013 | Yan | G06F 16/9535 707/732 |
| 2013/0151334 | A1* | 6/2013 | Berkhin | G06Q 30/0275 705/14.52 |
| 2013/0204711 | A1* | 8/2013 | Worthen | G06Q 30/0269 705/14.66 |
| 2013/0238425 | A1* | 9/2013 | Saldanha | G06Q 30/02 705/14.48 |

OTHER PUBLICATIONS

Ramsack; Interactive ROLAP on Large Databases; IEEE; p. 167-p. 176; public year 2001.*

* cited by examiner

| IP 302 | User Agent 304 | Location 306 | ... | Behavior 310 |
|---|---|---|---|---|
|  |  |  |  |  |

BEHAVIORAL RETARGETING SYSTEM AND METHOD FOR COOKIE-DISABLED DEVICES

PRIORITY CLAIM

This application claims the benefit of U.S. Provisional Patent Application No. 61/805,152 filed on Mar. 26, 2013, and which is incorporated by reference herein in its entirety.

TECHNICAL FIELD

The present description relates generally to a system and method for online advertising, and more particularly to a mobile advertisement retargeting system and method for cookie-disabled devices.

BACKGROUND

Advertisement retargeting is related to online advertising, and in particular, behavioral retargeting and CRM (customer relationship management) retargeting. Behavioral retargeting, also referred to as behavioral remarketing or retargeting, and CRM retargeting are forms of online targeted advertising where online advertising is directed or targeted to consumers based on their previous Internet or offline activity.

Behavioral retargeting and CRM retargeting use accumulated data or prior knowledge of a user or customer, typically accessible through a CRM system or similar database. In retargeting systems, advertisers use offline CRM system information, such as purchase history and search history, to optimize their online advertising.

Known retargeting systems depend on the consumers' web browser cookie to identify them. The consumers' previous online and offline activities are keyed by the web browser cookie. The user has the option to disable the cookie on a personal computer, thus is essentially in control of his or her own privacy requirements. However, various web browsers available on most mobile devices do not support third party cookies, and most mobile device applications do not support cookies as well. Without a stable cookie, advertisers cannot identify a consumer and deliver targeted advertising to a mobile device.

Because of the widespread adoption of mobile devices, such as smart phones and tablets, consumers increasingly spend more and more time on mobile devices. Different technologies exist to uniquely identify a user's mobile device, such as device fingerprinting, device unique identification, MAC address-based identification (media access control address), identification based on the MSID (mobile station ID) of the mobile phone, and the like. However, such unique mobile device identification techniques raise significant consumer privacy concerns, and may run contrary to legal regulations, especially because the user of most mobile devices cannot disable transmission and interception of the MSID and the like.

Mobile devices, such as smart phones and tablets, have become a significant media consumption point for consumers, and many applications on such mobile devices are configured to provide accurate user location, such as latitude and longitude based on GPS systems built into the mobile device. Given the privacy and legal issues mentioned above, and because of the lack of stable cookie data present on mobile devices and usable by mobile browsers, it is desirable to provide a more efficient behavior retargeting system and method that uses discernible attributes associated with a mobile device.

SUMMARY

In accordance with the systems, products, and methods described herein, a system is provided for retargeting advertisements. A database is provided to store user behavior data related to information for a plurality of consumers. An index-lookup processes the user behavior data and translates the user behavior data into a plurality of indices. A data loading module processes the plurality of indices and generates a multi-indexed user behavior cube. An online query module receives a request for an advertisement and processes the request to determine one or more related user attributes and retrieves user behavior data from the multi-indexed user behavior cube using the related user attributes. An ad recommendation module receives the set of user behaviors and generates a list of recommended advertisements using the set of user behaviors data and an advertiser retargeting criterion.

Additional systems and methods described herein provide for retargeting advertisements by storing user data to a database and processing the user data to generate indices. The indices are processed to generate a poly-indexed user data cube. A request for an advertisement is received and processed to determine one or more targeting criteria. User data is retrieved from the poly-indexed user data cube using the one or more targeting criteria. A list of one or more targeted advertisements is generated using the user data retrieved from the poly-indexed user data cube.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Accordingly, the invention is not to be restricted except in light of the attached claims and their equivalents.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

By way of introduction, online information systems place advertisements submitted by advertisers within content services made available to end users, such as web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser or those inferred by the system. The advertiser conventionally defines an advertising campaign to control how and when advertisements are made available to users and to specify the content of those advertisements. The content of the advertisements themselves is sometimes referred to as advertising creative or "creatives."

Advertisers typically provide or rely on third-parties to associate a variety of targeting criteria with their advertisement creatives. By associating targeting criteria with a particular advertisement, advertisers are able to reach consumers based on various traits, such as demographics, psychographics, behavioral variables (e.g., purchase history, or other online activities). In addition, to specifying targeting criteria, advertisers may also seek to use personalized retargeting or behavioral retargeting to allow an advertiser to engage particular consumers that may be more susceptible to advertisements or may otherwise be desirable to reach based on the consumer's prior interactions with monitored web content. For example, an advertiser may wish to use behavioral retargeting to present an advertisement to a user that recently visited a competitor's website but left without a conversion or completed sale. In this, and other contexts, behavior retargeting provides a desirable supplement to traditional advertising techniques.

Behavioral targeting typically requires knowledge of the user's past behavior or Internet activities in addition to traditional targeting data. For example, traditional targeting data may include demographic information, such as gender, age, occupation, technographic information, such as the equipment used, the type of client browser and operating system, Internet Protocol address and mapping to geographical information, context information, such as targeting data while visitors/consumers are present on a particular web site, inferred profile information, and the like. However, behavioral targeting data preferably utilizes traditional targeting data in conjunction with data obtained from a behavioral targeting system, which monitors and registers the activities and behavior of visitors/consumers while accessing various web sites, as well as timing information, such as the time of day or the day within a week when visitors/consumers respond favorably to the targeted advertisements. The behavioral targeting data is typically stored in a hidden object or file, such as a cookie, pixel, web beacon, tracking bug, tag, or other form of an object embedded in a web page and/or email. Users of websites are typically tagged and contextual information about the user's interactions with the site may be stored in the hidden object.

Because known retargeting systems depend on the consumers' web browser cookie to identify the user and track their behavior across multiple browsing sessions, without a stable cookie, advertisers cannot identify a consumer and deliver targeted advertising to a mobile device as previously described. This problem may also exist if a user disables cookies on their web browser, and such problems are especially prevalent in users of mobile devices that utilize web browsers which don't support third-party cookie capabilities or are set up to disable cookies by default. In such cookie-disabled systems, it is desirable to provide an alternative system and method for targeting advertising to consumers based on both traditional targeting data and behavioral targeting data, such as their previous online and offline activities.

The present description relates generally to a system and method for providing targeted advertising across cookie-disabled platforms and systems. In their most basic form, the system and methods of the present description seek to generate and utilize a multi-indexed data structure representing user behavior, also referred to herein as a poly-indexed user behavior data cube or hypercube, to associate consumer behaviors with retrievable data in a cookie-disabled system, such as from cookie-disabled mobile browsers. In certain embodiments, the system stores user behavior data relating to prior offline and online activities of a user. The user behavior data is processed to generate indices defining relationships between attribute data and user behaviors or events, such as interactions with monitored web content. The generated indices can then be assembled and associated into an aggregated data structure defining relationships between the various indices. In this way, the aggregated data structure can be made up of a series of indices, wherein each of the indices relates to a particular user behavior associated with a given set of user attributes.

In one embodiment, the aggregated data structure takes the form of a poly-indexed hypercube. Each index may be accessible, for example, by using a subset of the attribute data as key for the index, such as one or more traditional targeting data or behavioral targeting data, as discussed above. The data structure may be augmented with additional data as further user behavior data is received and stored by the system. In this way, the poly-indexed hypercube can "grow" or expand to include additional indices representing behaviors associated with additional subsets of attribute data. In accordance with further embodiments described herein, performance data may be used to optimize associations between indices and user behavior data. Additionally, performance data may also be used to optimize utilization of the poly-indexed hypercube to select advertisements from an advertisement cache.

Figure 1:
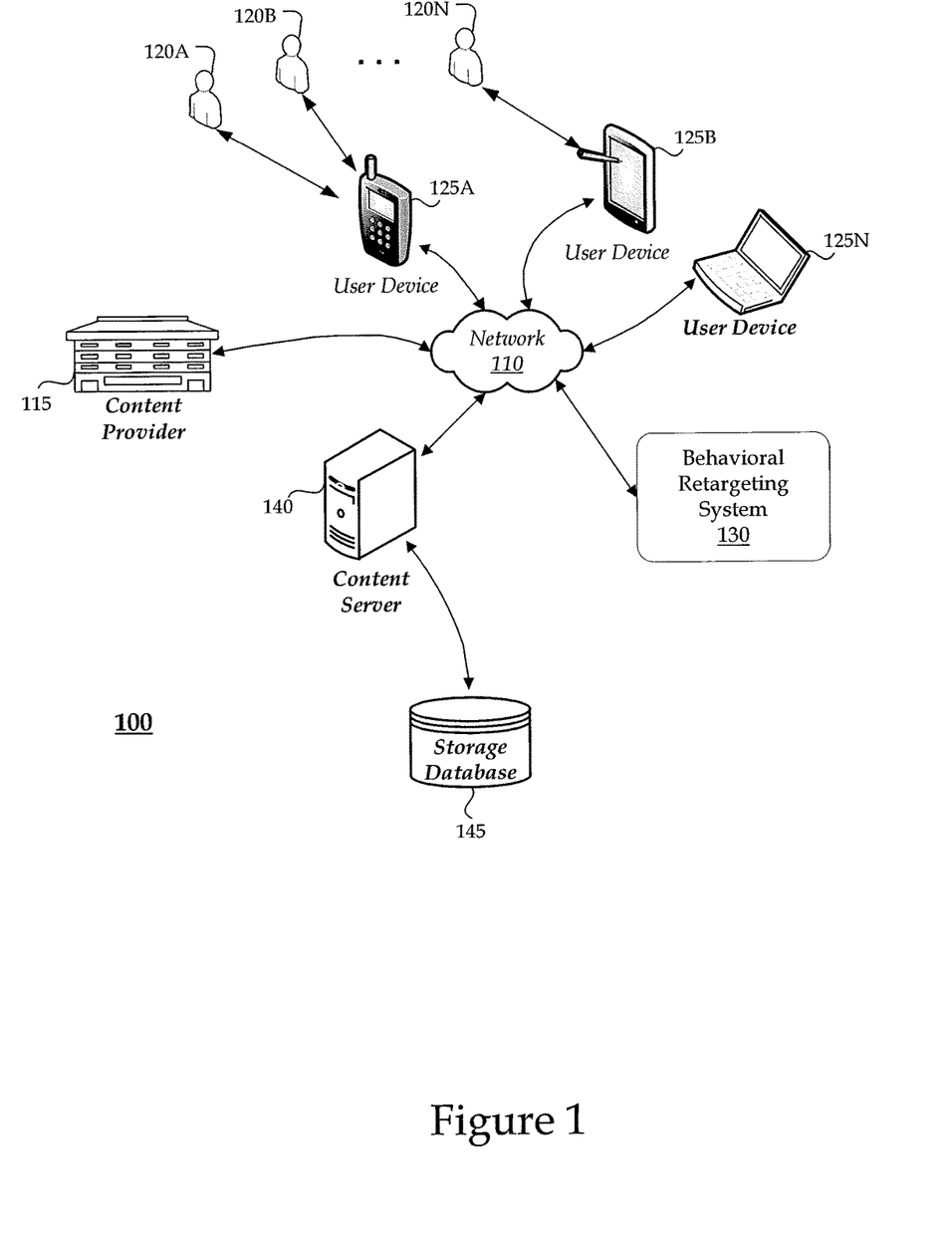
FIG. 1 is a block diagram of a network environment in which the behavioral retargeting system operates.

Referring now to the figures, FIG. 1 depicts a schematic diagram illustrating an example embodiment of a simplified network environment 100. Other embodiments that may vary, for example, in terms of arrangement or in terms of type of components, are also intended to be included within claimed subject matter. The network environment 100 may include, for example, a variety of communication networks 110, such as the Internet, a local area local area network (LAN), wide area network (WAN), a wireless network, and the like.

The network environment 100 may include one or more content providers 115. Content providers 115 may generate, create, provide, and/or sponsor content, such as web pages, websites, information, data, or other electronic content to one or more users 120A-120N, some of whom may access the network 110 using mobile devices 125A-N, such as smart phones, tables, PDA's (personal digital assistants), or other wireless devices. Examples of content may include text, images, audio, video, or the like, which may be processed in the form of physical signals, such as electrical signals, for example, or may be stored in memory, as physical states, for example. A behavioral retargeting system 130 may be operatively coupled to the network 110.

The users 120A-120N coupled to the network 110 may interact with the content provider 115. Users 120A-120N may be people, businesses, machines, content providers 115, the behavioral retargeting system 130, or entities and applications, which may connect and interact with each other through the network 110. Users 120A-120N may connect with content providers 115 and/or other users over the network 110 using one or more of a web application, a standalone application, a mobile application, or mobile client device. Each of the web applications, standalone applications, and mobile applications may individually be referred to as a client application or client device, or a user application or user device. Preferably, the mobile applications or mobile client device 125A-125N is contacted by or communicates with the behavioral retargeting system 130.

Not all of the depicted components in FIG. 1 may be in every system, however, and some implementations may include additional components not shown in the figures. Variations in the arrangement and type of the components may be made without departing from the spirit or scope of the claims as set forth herein.

The mobile client device or mobile application devices 125A-125N may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, a global positioning system (GPS) or other location-identifying type capability, or a display with a high degree of functionality, such as a touch-sensitive color 2D or 3D display, for example.

The mobile client device or mobile application devices 125A-125N may include a computing device capable of sending or receiving signals, such as via a wired or a wireless network. The users and/or client devices 120A-120N, may for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Figure 2:
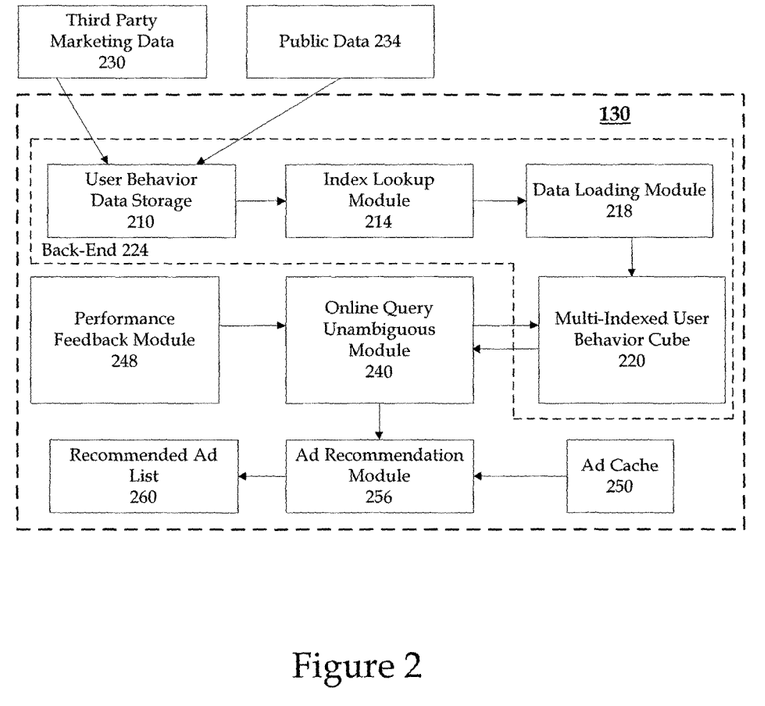
FIG. 2 is a block diagram of one embodiment of the behavioral retargeting system.

Referring now to FIG. 2, the behavioral retargeting system 130 is shown in greater detail in block diagram format. The behavioral retargeting system 130 includes user behavior data storage 210, also referred to as a user behavior database, an index lookup module 214, a data loading module 218, and a multi-indexed user behavior cube 220, which together form a back end data service 224 of the behavioral retargeting system 130.

In some embodiments, various data sources, such as third party marketing data 230 (data from various advertisers), publicly available data 234, such as US census data, and data from other data sources and databases, may be used to populate the user behavior database 210 with data, which data may then be provided to the index lookup module 214.

In some embodiments, the user behavior database 210 is referred to as "offline" because it is preferably populated during "backend" processing and is not necessarily accessed in a dynamic fashion by the behavioral retargeting system 130. Conversely, in some embodiments, the multi-indexed user behavior cube or database 220 is referred to as "online" because it is preferably accessed during "front-end" use or by real-time dynamic processing by the behavioral retargeting system 130. In this way, the user behavior database 210 may be updated at predetermined intervals or on a real-time basis. Similarly, index lookup module 214 may process data from the user behavior database in real-time and update one or more indices of, or create new indices for, the multi-indexed user behavior cube 220 in real-time.

Additional modules or components of the behavioral retargeting system 130 may include an online query unambiguous module 240, a performance feedback module 248, an advertisement cache 250, an advertisement recommendation module 256, and a recommended advertisement list 260. The above-described processing modules may be implemented in hardware, or may be implemented using a combination of hardware and software.

As an initial step, the user behavior database 210 may be populated or pre-populated with data. In some embodiments, the user behavior database 210 may be physically or logically segregated according to the different advertisers who use, access, and/or provide proprietary customer data, so as to ensure the privacy of the customer information and the proprietary nature of various advertisers' customer-base information. The user behavior database 210 may be populated with an advertiser's own proprietary CRM and pixel tracking data, or other web bug tracking data, data from third party marketing data 230, and/or data from publicly available data 234, such as US census data and or other public information, as discussed above.

Thus, the user behavior database 210 may be populated with data provided by a particular advertiser as well as data from other sources. The advertiser may maintain its own customer database and pixel data or may have purchased data from other database facilities. The advertiser may then provide its cumulative data to the user behavior database 210 for use in retargeting some of the advertisements. The data contributed by the particular advertiser may include specific data with respect to a customer, such as name, address, zip code, telephone number, purchase history, search history, marketing data, pixel data, and the like.

In certain embodiments, it is preferable not to positively identify the user who makes the query using a mobile device, regardless of whether the user is or is not listed in the user behavior database 210. Rather, in such embodiments, the identity of such a user making the query from a mobile device may be maintained in private manner, if desired, through the use of informed behavioral retargeting. For example, while certain embodiments may make use of device IDs, device fingerprint IDs, and the like, a user's identify need not be verified or confirmed, as the system is able to accurately serve retargeted advertisements to that user through the user of the multi-indexed user behavior cube 220, in accordance with various systems and methods as described herein.

Once the user behavior database 210 has been populated with data, either initially or as an ongoing updating process, the data is indexed by index lookup module 214. Unlike known retargeting systems, the input data in the user behavior database 210 is not indexed solely by cookie-type identification, but rather indexing may make use of a variety of different attribute data in addition to cookie-type data, including, but not limited to, data such as identifierForAdvertising (IDFA) or identifierForVendor (IDFV) for iOS devices, unique device ID (UDID), device platform ID (DPID), Internet protocol (IP) address, user-agent string, timestamps, mobile application information, geo-location retargeting, and the like. Methods and systems for conduct geo-location retargeting are described in commonly-developed U.S. patent application Ser. No. 13/951,091, entitled Location Retargeting System for Online Advertising, which is hereby incorporated by reference in its entirety.

While the aforementioned attribute types are characteristic of the nature of attributes contemplated as being well-suited for retargeting, they are intended to be non-limiting examples of the types of attribute data that may be used for behavioral retargeting in accordance with the present description. It will be apparent to those of ordinary skill in the art that additional attribute types may also be used, such as any of the previously described types of traditional targeting data and/or behavioral targeting data, as well as any form of tracking data that may be developed in the future and used within the spirit and scope of the invention.

As mentioned above, the index lookup module 214 is configured to convert each applicable data field in the user behavior database 210 into a series of indices keyed by attribute type. Each processed index may be incorporated as a row in the multi-indexed user behavior cube 220. As described in further detail in connection with FIG. 4 below, index keys may be used to retrieve the indices corresponding to a particular set of attributes. After processing by the index lookup module 214, each data row in the multi-indexed user behavior cube 220, and thus the corresponding user behavior data, will be keyed and accessible by attribute type.

Figure 3:
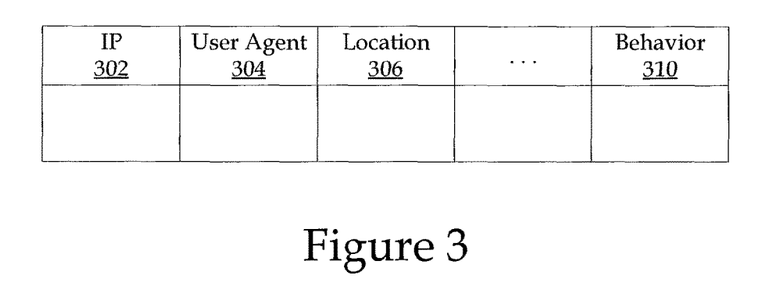
FIG. 3 is an illustration of one embodiment of user behavior data in a database.

Referring now to FIG. 3, a simplified example of an advertiser's data entry before conversion by the index lookup module 214 is illustrated, which may be provided to the user behavior database 210 by an advertiser or a vendor. Each row of data entered into user behavior data storage 210 may contain a plurality of data fields with respect to the customer or user, and may also include the identity of the advertiser (or business entity), if desired. As described above, the information regarding the user or customer may have been accumulated and provided by the vendor or business entity, such as an on-line business, a "brick and mortar" store, or any commercial establishment with whom the user or customer has had dealings, and has supplied such data to the commercial establishment.

Such data fields may include, for example, an identity of the IP address 302 of the user or corresponding device, a user agent string 304, or a location 306 of the user, such as determined by GPS or geo-location methods. Rows of data may also contain any number of the illustrated data types, as well as any number of the attribute types discussed above, and preferably also contains other information with respect to the user's prior history, such as purchase history and other marketing information generally.

Returning now to FIG. 2, each of the rows of data described in connection with FIG. 3 are converted into indices by index lookup module 214. Each row of data is processed by index lookup module 214 to associate an index with a particular user behavior data point. In other words, each index generated by index lookup module 214 may correspond to one or more user behaviors or actions are that likely to result when the properties associated with the particular index key are shared by the targeted user. As will be explained in further detail, the user behavior data corresponding to an index may be retrieved and further processed by online query unambiguous module 240 and performance feedback module 248 to accurately generate a recommended ad list 260.

In certain embodiments, the user behavior database 210 may be updated at predetermined intervals or on a real-time basis. Similarly, index lookup module 214 may process data from the user behavior database 210 in real-time and update one or more indices of, or create new indices, in real-time. Once processed, data loading module 218 will load processed user input data into poly-indexed data cube 220.

Data loading module 218 further processes the indices in order to generate and update a multi-indexed data structure representing one or more user behavior data points. Once processed, multi-indexed user behavior data cube 220 forms a data cache for user behavior data. The data cache may be stored in a single database or may be distributed across one or more distributed databases. The respective key for each processed index in the data cache is formed by the subset of data attributes that correspond to the particular index or user behavior. For example, indices may be keyed by IP address 302, or IP address 302 and user agent string 304, or IP address 302, user agent string 304, and location data 306, and so forth. For each index, the key values will therefore be the attribute data types that correspond to the use behavior data that was processed by index look module 214 to create the respective index.

The various indices forming the components of the multi-indexed user behavior cube 220 may be organized as B-tree, hashmap, or other data structure that allows efficient storage and retrieval. For each generated index, data loading module 218 is able to lookup existing indices from multi-indexed user data cube 220 by the attribute key. If the attribute key corresponds to an existing index in the multi-indexed user data cube 220, a reference to the user behavior data corresponding to that subset of attribute data types will be added to the index according to an integration rule. For example, in certain embodiments, various procedures can be used to assign weights to the different attribute types or components that make-up or form an index. Thus, integration rules may utilize heuristic and optimization approaches, such as machine learning, to assign weights to each index component. Performance data can be analyzed in order to allocate weights to attributes that improve overall targeting and behavior matching quality of the respective index. If the index is not found in the cube, a new index can be created with a reference to the user behavior data for that particular subset of attribute data types. The new index can then be retained and its corresponding weight and performance data can be updated as additional data is received by the system.

Figure 4:
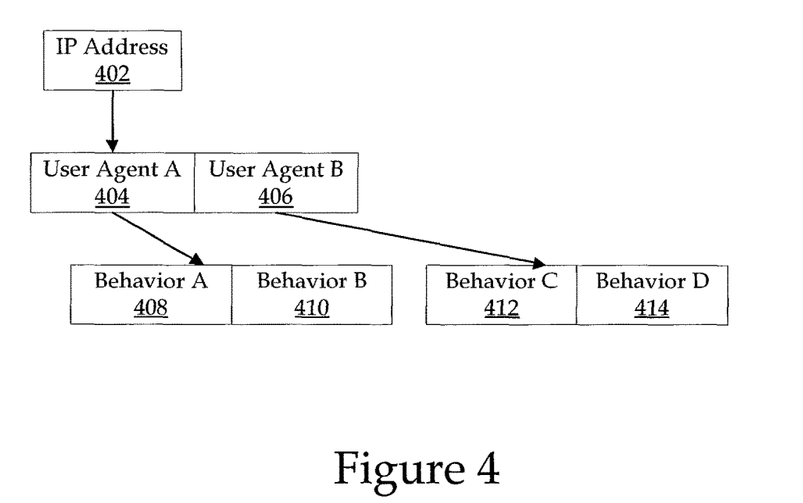
FIG. 4 is an illustration of one embodiment of poly-indexed user behavior data in a database.

Referring now to FIG. 4, an illustration of one embodiment of a poly-indexed user behavior data cube in a database is shown. User behavior data corresponding to user behavior A 408—user behavior D 414 are accessible by multiple indices corresponding to attribute keys 402-406. For example, user behavior A 408 and user behavior B 410 are keyed by a combination of IP address 402 and user agent string A 404. Additionally, although not depicted, user behavior A 408 may also be keyed, and thus accessible, by one or more other subsets of attribute types, as described above in connection with FIG. 2. In this way, multi-indexed user behavior cube 220 includes multiple indices of varying lengths and dimensions. Each attribute type may include one dimension an index and may be combined to form the keys of the various indices forming the multi-indexed user behavior cube 220, thereby allowing the user behavior data corresponding to each catalogued user behavior to be accessible by one or more keys of attribute data.

Referring again to FIG. 2, in operation, when a user on a mobile device performs a query, the query is inspected and analyzed by the online query unambiguous module 240. In addition, online query unambiguous module 240 may be configured to receive and process requests for advertisements by an advertiser specifying one or more targeting attributes, such as through a real-time bid (RTB) request. Online query unambiguous module 240 looks up poly-index user behavior data from poly-indexed user behavior cube 220 by attribute type or index key. In certain embodiments, online query module unambiguous module 240 will retrieve not only the user behavior data associated with a full key of the specified attributes, but also any permutation of the specified attributes. Thus, given a list of targeting criteria, online query unambiguous module 240 can process the targeting criteria and retrieve indices by attribute data such as IP address, user agent string, and the like, as well as every permutation thereof. In this way, the online query unambiguous module 240 is able to gather a more complete set of user behavior data before running various optimization processes. If needed, online query unambiguous module 240 may also perform extrapolation processes in order to extrapolate the specified targeting criteria to user attributes that are known and used by the behavioral retargeting system 130. Online query unambiguous module 240 will then retrieve, via poly-indexed user behavior cube 220, sets of user behavior data referenced by the keyed indices.

In certain embodiments, online query unambiguous module 240 may also be configured to retrieve performance data for particular sets of attributes from performance feedback module 248. Performance data may be stored in one or more databases, distributed or otherwise, in a manner similar to databases storing the data cache making up the multi-indexed user behavior cube 220. Thus, in certain embodiments, online query unambiguous module 240 and performance feedback module 248 may retrieve relevant performance data by key in the same way indices are retrieved from the multi-indexed user behavior cube 220. The performance feedback module 248 may access the appropriate distributed server that contains the performance data corresponding to the specified attributes. Performance feedback module 248 processes the sets of user behavior data using the performance feedback data relevant to each set of behavior data in order to improve behavior matching quality for the respective user behavior data retrieved from poly-indexed user behavior cube 220. In certain embodiments, performance feedback module 248 may utilize one or more machine learning approaches to further optimize processing of performance data targeted and to improve behavior matching quality.

Performance feedback module 248 may analyze the effectiveness of various advertisements for the selected advertiser based on the specified targeting criteria, and provide a rating of such advertising effectiveness to the online query unambiguous module 310. For example, if the selected advertiser has a high click-through rate for certain advertisements sharing a particular set of user attributes, such advertisements may recommended for retargeting by the performance feedback module 248. In other words, advertisements having a high conversion rate for a particular advertiser may be recommended for retargeting. Other advertisements for the selected advertiser may not be recommended if the conversion rate or other criteria indicates that such advertisements are not particularly effective given the targeting criteria specified.

In certain embodiments, after retrieving all of the performance data results, online query unambiguous module 240 may perform additional unambiguity computation to find the most relevant behavior for a specified set of targeting attributes. One goal of processing the behavior data using, for example, the performance feedback data and the unambiguity computation is to identify the user behaviors or events that are most likely to be relevant to a given advertisement request or RTB request. For example, unambiguity computations can be utilized to consider contextual data surrounding the generation of the particular user behavior data, such as recency of the data, time of interaction, browser data, as well as other contexts, in order to determine whether the subset of user behavior data is particularly suitable for a given advertisement context. A person having skill in the art would recognize that additional optimization techniques may be used within the scope and spirit of the description.

The results from the online query unambiguous module 240 are sent to ad recommendation module 256. Because the multi-indexed user behavior cube 220 may contain varying levels of indexed behavior data, an advertiser is able to more accurately target a specific user using the known user behavior data for that user or similar users. Also, assuming that the multi-indexed user behavior cube 220 has been populated with attribute data previously provided to the user behavior database 210 with respect to the users or similar user's purchases and search history, the behavioral retargeting system 130 can refine and select relevant advertisements for retargeting, where such similar users may share varying levels of common attributes with the user placing the instant query or the targeting criteria specified by the advertiser requesting the instant advertisement. The online query unambiguous module 240 stores this processed data as set of results.

The online query unambiguous module 240 may then provide the results to the advertisement recommendation module 256, including the recommendation of potential advertisers and corresponding advertisements for retargeting from the performance feedback module 248, as well as data identifying the user events or behaviors that are most likely to result in advertisement quality, such as through increased click-through rate. The advertisement recommendation module 256 uses the input data to rank all advertisements and stores all ranked advertisements in the advertisement cache 250.

The advertisement recommendation module 256 may iteratively process all the ads in the advertisement cache 250 and rank each advertisement according to its targeting criteria and available data. The advertisement recommendation module 256 may utilize machine learning algorithms, statistic modeling, and/or optimization processing techniques to blend the advertiser's multi-tier CRM data and multi-tier indexed advertising performance data with advertising targeting data. All ads will be ranked and will be output to the recommended advertisement list 260 by the advertisement recommendation module 256.

Figure 5:
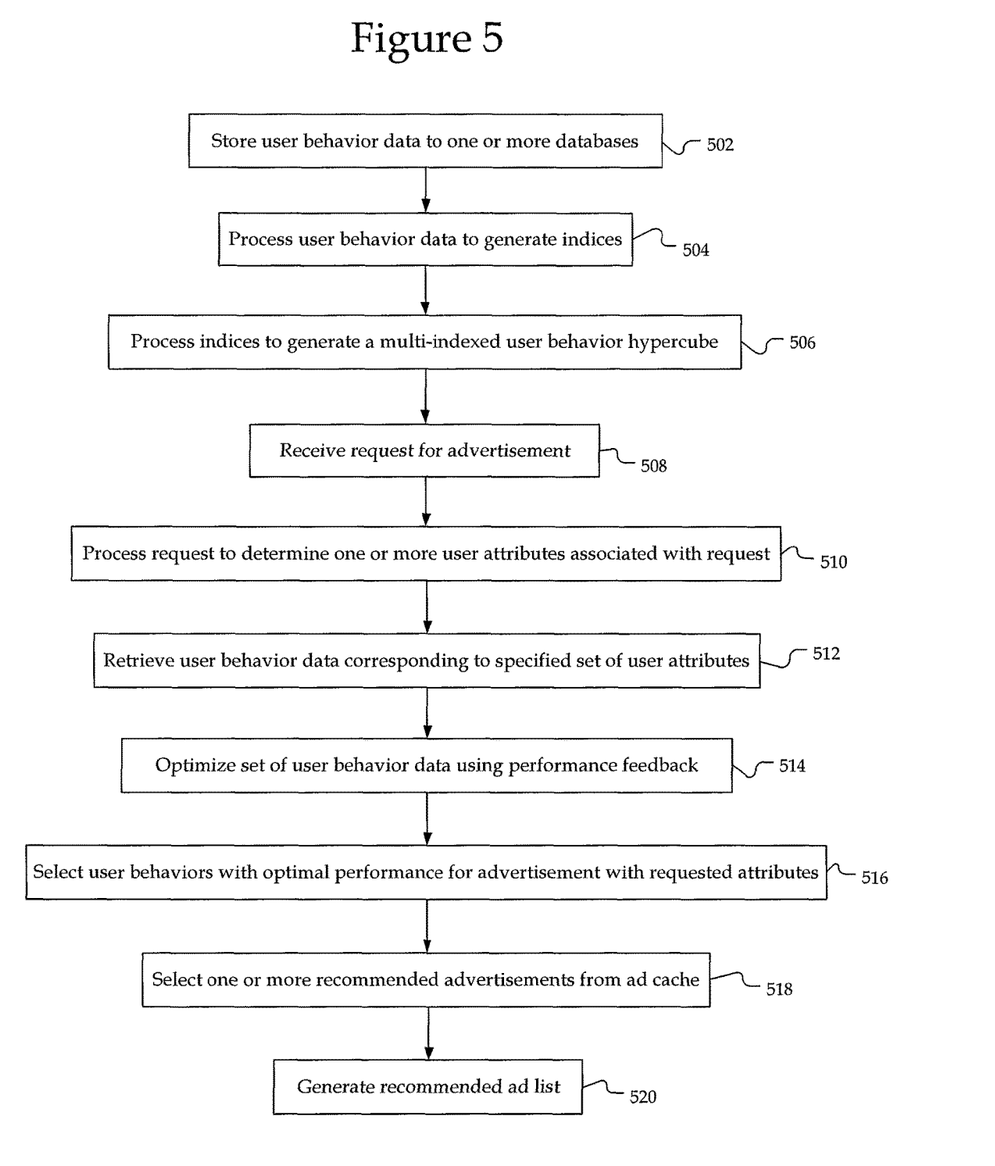
FIG. 5 is a flowchart illustrating an exemplary method for generating a recommended ad list according to one embodiment.

Referring now to FIG. 5, a flowchart illustrating an exemplary method for generating a recommended ad list according to one embodiment is depicted. At block 502, user behavior data cache is stored in one or more databases. The data cache may be stored in a single database or may be distributed across one or more distributed databases. As further described in connection with FIG. 6 below, user behavior data may be provided by the advertiser or may be compiled through injection of data from one or more databases, such as third party CRM or marketing data, publicly available data, and data from other data sources. Additionally, user behavior data may be updated in response to monitoring of user interactions with monitoring web content on a real-time basis. At block 504, the user behavior data is processed to generate one or more indices. Indices are representative one or more user behaviors and are keyed by attribute type. Indices may be generated according to the number of attribute types available corresponding to each user behavior. For example, given a particular user behavior, an index may be generated for just one attribute type (e.g., IP address), or multiple permutations of attribute types (e.g., IP address, as well as IP address and user agent string, etc.).

At block 506, indices are processed to generate a multi-indexed user behavior hypercube representing one or more user behavior data points. Each index forming a component of the multi-indexed user behavior hypercube is retrievable by the attributes forming the key for that particular index. Thus, each user behavior data point is accessible by one or more indices and their associated keys. Further, the multi-indexed user behavior hypercube may be updated or augmented periodically or in real-time as additional data is retrieved or entered into the system.

At block 508, a request for an advertisement is received or triggered by an external event. For example, an advertiser may submit a RTB request or a user may enter a query, thereby triggering the request for an advertisement. At block 510, the request is processed to determine one or more user attributes associated with the request. The user attributes may be explicitly specified by the advertiser or the RTB request as targeting criteria, or the system may use methods for extrapolating the information provided to one or more user attributes recognized by the system.

At block 512, user behavior data is retrieved by querying the multi-indexed user behavior hypercube using the one or more specified user attributes or their processed results as keys. In one embodiment, the behavioral retargeting system may retrieve not only the indices having a key consisting of the full range of specified user attributes, but also any permutation thereof. In this way, the system gathers a larger set of user behavior data having varying levels of relativity to the specified targeting criteria. At block 514, the set of user behavior data retrieved from the multi-indexed user behavior hypercube is optimized using performance feedback data. In certain embodiments, the user behavior data may also be optimized using machine learning techniques and unambiguity processing techniques.

At block 516, the set of user behaviors having optimal performance for the specified advertisement and targeting criteria are selected from the processed data results. At block 518, one or more recommended advertisements are selected from an ad cache, such as by iterating through advertisements to identify one or more advertisements that match the optimal set of user behavior data. Based on the determined effectiveness of certain advertisements for the selected advertiser, one or more advertisements are recommended for retargeting. At block 520, a list of recommended ads is generated using the results from block 518.

Figure 6:
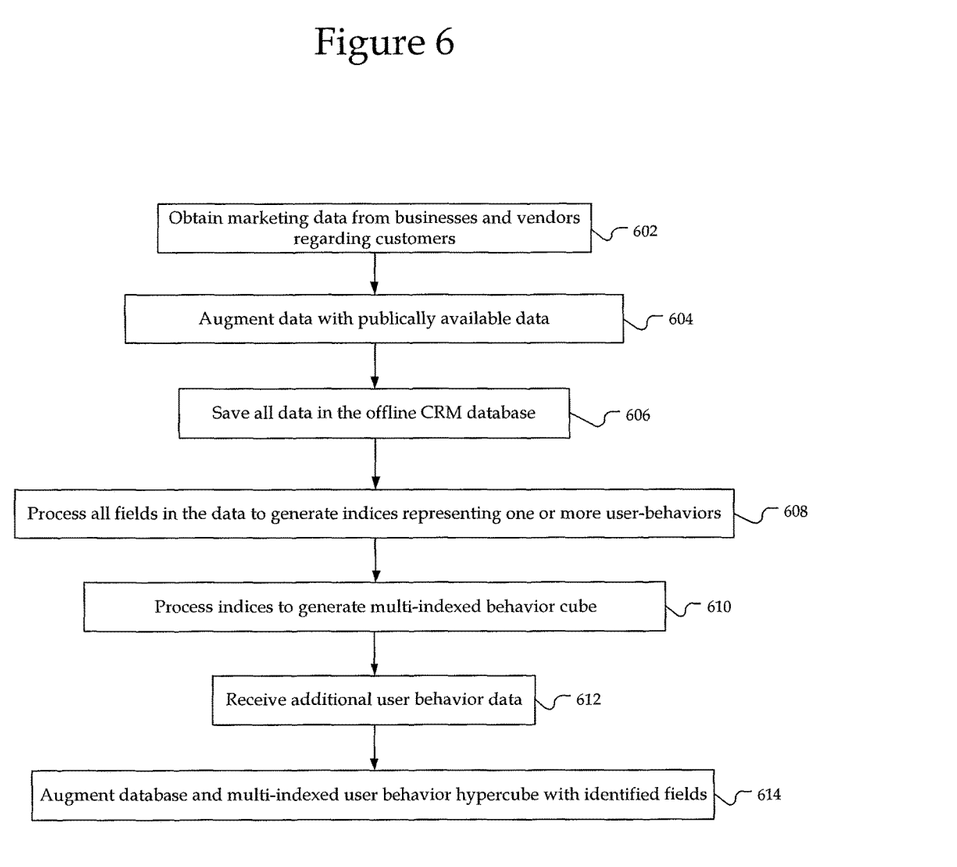
FIG. 6 is a flowchart illustrating an exemplary method for populating a user behavior database augmenting poly-indexed user behavior data with additional data.

FIG. 6 is a flowchart a flowchart illustrating an exemplary method for populating a user behavior database and augmenting user behavior data with additional data. Initially, to build of the user behavior database 210, marketing data from businesses and vendors regarding their customers is obtained at block 602. At block 604, the data may then be supplemented with publicly available data, which may assist in further providing user behavior data to be indexed. At block 606, once all the data has been accumulated, it may be saved in one or more offline databases, such as CRM databases. In certain embodiments, each data entry or record may be represented as an indexed line or row of data having multiple fields.

At block 608, each field or entry in the data is processed to generate an initial set of indices representing on or more user behaviors. At block 610, the generated set of indices are used to construct the initial multi-indexed behavior cube corresponding all of the indices for which data was obtained at blocks 602 and 604.

At block 612, additional user behavior data is received, such as by injection or through real-time monitoring of user interactions with monitored online content. User behavior data may be recognized as new, for example, when a request is made to retrieve an index key and no index is found. Corresponding user behavior can then be saved and index created for such data. At block 614, the database is augmented with the new user behavior data. Also at block 614, the multi-indexed behavior hypercube is augmented with any generated indices for the newly identified user behavior data. Note that the above process may be an ongoing process such that the offline CRM database and multi-indexed user behavior cube 220 may be continuously updated as new information is received or uncovered. The system may be updated periodically or in real-time as information is received.

Note that in FIG. 1, the content provider 115 may include, and/or be operable to use or access the content server 140 or search server, which may be indirectly coupled to the content provider 115 through the network 110, or may be directly coupled to the content provided 115. The content server 140 may include a device that includes a configuration to provide content via a network to another device. The content server 140 may, for example, host a site, such as a social networking site, examples of which may include, without limitation, Flicker, Twitter, Facebook, LinkedIn, or a personal user site (such as a blog, vlog, online dating site, etc.). The content server 140 may also or alternatively host a variety of other sites, including, but not limited to business sites, educational sites, dictionary sites, encyclopedia sites, wikis, financial sites, government sites, etc. The content server 140 may be operatively coupled to the storage device or database 145, which may be, or include distributed storage devices.

The content server 140 may provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of devices that may operate as a content server include desktop computers, multiprocessor systems, microprocessor-type or programmable consumer electronics. Other examples are possible.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The various client devices and/or client applications 125A-125N may include or may execute a variety of operating systems, including a personal computer operating system, such as a Windows, iOS or Linux, or a mobile operating system, such as iOS, Android, or Windows Mobile, or the like. Such client devices and or applications may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The client devices and/or client applications 125A-125N may also include or execute an application to communicate content, such as, for example, textual content, multimedia content, or the like. The client devices and/or client applications 125A-125N may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

With respect to FIG. 1, the network 110 may also include other mass storage in addition to the storage device or database 145, such as network attached storage (NAS), a storage area network (SAN), or other forms of computer or machine readable media, for example. The network 110 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs The network 110, which is a communication link or channel, may include for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The network 110 may include wired or wireless networks. A wireless network may couple client devices with a network. A wireless network may employ stand-alone ad-hoc networks, mesh networks, Wireless LAN (WLAN) networks, cellular networks, an 802.11, 802.16, 802.20, or WiMax network. Further, the network 110 may be a public network, such as the Internet, a private network, such as an intranet, or combinations thereof, and may utilize a variety of networking protocols now available or later developed including, but not limited to TCP/IP based networking protocols.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Many communication networks send and receive signal packets communicated via the various networks and sub-networks, and form a participating digital communication network, and which may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6, or as may developed.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network 110 may be or include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The network 110 may be or include a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

The network 110 may be or include a social network. The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The network environment 100 may be configured or operable for multi-modal communication which may occur between members of a social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, SMS/MMS, email, instant messenger clients, forums, social networking sites (such as Facebook, Twitter, or Google+), or the like.

A search engine may enable a device, such as a client device, to search for files of interest using a search query. Typically, a search engine may be accessed by a client device via one or more servers. A search engine may, for example, in one illustrative embodiment, comprise a crawler component, an indexer component, an index storage component, a search component, a ranking component, a cache, a profile storage component, a logon component, a profile builder, and one or more application program interfaces (APIs). A search engine may be deployed in a distributed manner, such as via a set of distributed servers, for example. Components may be duplicated within a network, such as for redundancy or better access.

A crawler may be operable to communicate with a variety of content servers, typically via network. In some embodiments, a crawler starts with a list of URLs to visit, which may be referred to as a seed list. As the crawler visits the URLs in the seed list, it may identify some or all the hyperlinks in the page and add them to a list of URLs to visit, which may be referred to as a crawl frontier. URLs from the crawler frontier may be recursively visited according to a set of policies. A crawler typically retrieves files by generating a copy for storage, such as local cache storage. A cache may refer to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight, in one example embodiment may be assigned substantially in accordance with a difference between the number of records indexed without the index entry and the number of records indexed with the index entry.

The term "Boolean search engine" refers to a search engine capable of parsing Boolean-style syntax, such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., science of meaning in language) to search repositories of various types of content.

Search results located during a search of an index performed in response to a search query submission may typically be ranked. An index may include entries with an index entry assigned a value referred to as a weight. A search query may comprise search query terms, wherein a query term may correspond to an index entry. In an embodiment, search results may be ranked by scoring located files or records, for example, such as in accordance with number of times a query term occurs weighed in accordance with a weight assigned to an index entry corresponding to the query term. Other aspects may also affect ranking, such as, for example, proximity of query terms within a located record or file, or semantic usage, for example. A score and an identifier for a located record or file, for example, may be stored in a respective entry of a ranking list. A list of search results may be ranked in accordance with scores, which may, for example, be provided in response to a search query. In some embodiments, machine-learned ranking (MLR) models are used to rank search results. MLR is a type of supervised or semi-supervised machine learning problem with the goal to automatically construct a ranking model from training data.

In one embodiment, as an individual interacts with a software application, e.g., an instant messenger or electronic mail application, descriptive content, such in the form of signals or stored physical states within memory, such as, for example, an email address, instant messenger identifier, phone number, postal address, message content, date, time, etc., may be identified. Descriptive content may be stored, typically along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A profile builder may initiate generation of a profile, such for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example. A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

Advertising may include sponsored search advertising, non-sponsored search advertising, guaranteed and non-guaranteed delivery advertising, ad networks/exchanges, ad targeting, ad serving, and/or ad analytics. Various monetization techniques or models may be used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

An "ad server" comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

While the computer-readable medium as described or set forth in the appended claim may be described as a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

Note that dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for retargeting advertisements usable with cookie-disabled users, the system comprising:
   a processor; and
   memory comprising instructions that, when executed by the processor, perform actions comprising:
   storing historical user behavior data comprising information related to a plurality of consumers, wherein the historical user behavior data are collected from respective mobile devices of the plurality of consumers, the mobile devices having web browsing cookies disabled from on-line web browsing;
   processing the historical user behavior data and translating the historical user behavior data into a plurality of indices;
   processing the plurality of indices and generating a multi-indexed user behavior cube corresponding to a particular user by indexing historical user identification attributes to historical user behaviors, wherein the multi-indexed user behavior cube comprises two or more indices, associated with a plurality of lengths and dimensions, including (i) a first index that comprises a first behavior and a second behavior and that is keyed by a combination of a first attribute key and a second attribute key and (ii) a second index that comprises a third behavior and a fourth behavior and that is keyed by a third attribute key, wherein the first behavior is keyed by one or more other attribute keys in the multi-indexed user behavior cube, wherein the first index has a different length than the second index, wherein the first behavior and the second behavior of the first index are accessible using the first attribute key and are accessible using the second attribute key, wherein the third behavior and the fourth behavior of the second index are accessible using the third attribute key, and wherein the first behavior is accessible using the one or more other attribute keys;

receiving an advertisement request from a respective mobile device and processing the advertisement request to determine one or more related user identification attributes pertaining to the respective mobile device;

retrieving a set of one or more predicted user behaviors from the multi-indexed user behavior cube via at least one of the plurality of indices and using at least the one or more related user identification attributes as an input to the multi-indexed user behavior cube, the set of one or more predicted user behaviors at least based on a historical user behavior indexed by the at least one of the plurality of indices; and generating a list of recommended advertisements using the set of one or more predicted user behaviors and an advertiser retargeting criterion in order that advertisers deliver targeted advertisement to the respective mobile device according to the advertiser targeting criterion and the one or more related user identification attributes without utilizing the disabled web browsing cookies.

2. The system of claim 1, wherein the set of one or more predicted user behaviors comprises a subset of the historical user behavior data.

3. The system of claim 2, wherein the actions comprise processing the subset of stored historical user behavior data to generate a filtered list of user behaviors.

4. The system of claim 1, wherein the multi-indexed user behavior cube defines an association between the plurality of indices.

5. The system of claim 4, wherein the multi-indexed user behavior cube comprises one or more indices organized in a linked structure, hashmap, or associative array.

6. The system of claim 1 wherein the actions comprise receiving the set of one or more predicted user behaviors and retrieving performance data for the set of one or more predicted user behaviors.

7. The system of claim 6, wherein the actions comprise processing the set of one or more predicted user behaviors using the performance data and to produce data results relating to one or more predicted user behavior's impact on advertising conversions.

8. The system of claim 1, wherein the actions comprise receiving additional user behavior data in real-time, and processing the additional user behavior data to generate or update indices in real-time.

9. The system of claim 1, wherein recommended advertisements of the list of recommended advertisements are selected from a data cache of advertisements.

10. The system of claim 1, wherein the multi-indexed user behavior cube comprises a data cache distributed over a plurality of databases.

11. A non-transitory computer readable storage medium having stored therein data representing instructions executable by a programmed processor on a server for retargeting advertisements usable with cookie-disabled users, the computer readable storage medium comprising instructions which causes the server to perform functions comprising:

storing historical user behavior data to a database, the historical user behavior data defining one or more aspects of a plurality of user's interactions with web content, wherein the historical user behavior data are collected from respective mobile devices of a plurality of users, the mobile devices having web browsing cookies disabled from on-line web browsing;

processing the historical user behavior data to generate a plurality of indices, wherein each index defines a relationship between one or more user identification targeting attributes and the historical user behavior data;

processing the plurality of indices to generate a multi-indexed user behavior hypercube corresponding to a particular user defining a relationship between the plurality of indices, wherein the multi-indexed user behavior hypercube comprises two or more indices, associated with a plurality of lengths and dimensions, including (i) a first index that comprises a first behavior and a second behavior and that is keyed by a combination of a first attribute key and a second attribute key and (ii) a second index that comprises a third behavior and a fourth behavior and that is keyed by a third attribute key, wherein the first behavior is keyed by one or more other attribute keys in the multi-indexed user behavior hypercube, wherein the first index has a different length than the second index, wherein the first behavior and the second behavior of the first index are accessible using the first attribute key and are accessible using the second attribute key, wherein the third behavior and the fourth behavior of the second index are accessible using the third attribute key, and wherein the first behavior is accessible using the one or more other attribute keys;

receiving a request from a respective mobile device for an advertisement and processing the request to identify a set of user identification targeting attributes pertaining to the respective mobile device;

retrieving, from the multi-indexed user behavior hypercube, predicted user behavior comprising a subset of the historical user behavior data using at least the set of user identification targeting attributes and at least one of the plurality of indices, the predicted user behavior at least based on a historical user behavior indexed by the at least one of the plurality of indices; and generating a list of recommended advertisements using the predicted user behavior in order that advertisers deliver targeted advertisement to the respective mobile device according to the list of recommended advertisements and the set of user identification targeting attributes without utilizing the disabled web browsing cookies.

12. The computer readable storage medium of claim 11, wherein the multi-indexed user behavior hypercube comprises a keyed database storing the plurality of indices.

13. The computer readable storage medium of claim 12, wherein the subset of the historical user behavior data is retrieved using a permutation of the set of user identification targeting attributes as a key.

14. The computer readable storage medium of claim 11, further comprising instructions for processing the subset of the historical user behavior data using performance feedback data to produce data results relating to the historical user behavior data's impact on advertising conversions.

15. The computer readable storage medium of claim 11, further comprising instructions for receiving additional user behavior data and updating the database in real-time.

16. The computer readable storage medium of claim 11, wherein the database comprises data received from a combination of advertiser data, census data, third-party data, data search history data, or purchase history data.

17. A method for retargeting advertisement usable with cookie-disabled mobile devices, the method comprising:

storing historical user data comprising historical user identification attributes and historical user behaviors to a database, wherein the historical user behavior data are collected from respective mobile devices having web browsing cookies disabled from on-line web browsing;

processing the historical user data to generate a plurality of indices between the historical user identification attributes and the historical user behaviors;

processing the plurality of indices to generate a poly-indexed user data cube, wherein the poly-indexed user data cube comprises two or more indices, associated with a plurality of lengths and dimensions, including (i) a first index that comprises a first behavior and a second behavior and that is keyed by a combination of a first attribute key and a second attribute key and (ii) a second index that comprises a third behavior and a fourth behavior and that is keyed by a third attribute key, wherein the first behavior is keyed by one or more other attribute keys in the poly-indexed user data cube, wherein the first index has a different length than the second index, wherein the first behavior and the second behavior of the first index are accessible using the first attribute key and are accessible using the second attribute key, wherein the third behavior and the fourth behavior of the second index are accessible using the third attribute key;

receiving a request for an advertisement;

processing the request to determine one or more targeting criteria comprising a current user identification attribute pertaining to a mobile device;

retrieving a predicted user behavior from the poly-indexed user data cube using the one or more targeting criteria and at least one of the plurality of indices, the predicted user behavior at least based on a historical user behavior indexed by the at least one of the plurality of indices; and generating a list of one or more targeted advertisements using the predicted user behavior retrieved from the poly-indexed user data cube in order that advertisers deliver targeted advertisement to the mobile device according to the one or more targeting criteria and the historical user identification attributes without utilizing the disabled web browsing cookies.

18. The method of claim 17, further comprising processing a sub set of user data using performance data to produce data results relating to the historical user data's impact on advertising conversions.

19. The method of claim 17, further comprising receiving additional user data and updating the database with the additional user data in real-time.

20. The method of claim 19, further comprising processing the additional user data to generate a plurality of additional indices, and processing the plurality of additional indices to augment the poly-indexed user data cube with the plurality of additional indices.

\* \* \* \* \*